United States Patent
Watanabe et al.

(10) Patent No.: US 10,643,075 B2
(45) Date of Patent: May 5, 2020

(54) METHOD, APPARATUS FOR IMAGE ANALYSIS BASED ON COLOR SATURATION, AND NON-TRANSITORY COMPUTER-READABLE STORAGE MEDIUM

(71) Applicant: FUJITSU LIMITED, Kawasaki-shi, Kanagawa (JP)

(72) Inventors: Hiroya Watanabe, Ota (JP); Shinji Shigeno, Oita (JP); Kenji Kodama, Yufu (JP); Akihito Kanamori, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 15/896,234

(22) Filed: Feb. 14, 2018

(65) Prior Publication Data
US 2018/0260631 A1 Sep. 13, 2018

(30) Foreign Application Priority Data
Mar. 13, 2017 (JP) ................. 2017-047811

(51) Int. Cl.
*G06K 9/00* (2006.01)
*G06K 9/58* (2006.01)
(Continued)

(52) U.S. Cl.
CPC ....... *G06K 9/00744* (2013.01); *A61D 17/008* (2013.01); *G06K 9/00771* (2013.01);
(Continued)

(58) Field of Classification Search
CPC ...... A01K 11/004; G03B 7/091; G03B 21/00; G06K 9/4647; G06K 9/00771;
(Continued)

(56) References Cited

U.S. PATENT DOCUMENTS 8,121,404 B2 * 2/2012 Xiao ................ G03B 7/091
348/229.1
8,229,171 B2 * 7/2012 Takahashi .......... G06K 9/00771
382/104
(Continued)

FOREIGN PATENT DOCUMENTS

JP 2003-259137 A 9/2003
JP 2016-118912 A 6/2016

OTHER PUBLICATIONS

Prasad, S. et al., "Skin Segmentation Based Face Tracking Independent of Lighting Conditions", Proceedings of the International Conference & Workshop on Emerging Trends in Technology, (ICWET 2011)—TCET, Mumbai, India, vol. 123, Feb. 25, 2011, pp. 123-126, XP055496897.
(Continued)

Primary Examiner — Xuemei G Chen
(74) Attorney, Agent, or Firm — Fujitsu Patent Center

(57) ABSTRACT

A method performed by a computer for image analyzation includes: receiving, by a processor of the computer, an image captured by an imaging device; specifying, by the processor of the computer, first and second areas in the image; detecting, by the processor of the computer, a target object from the image in accordance with a certain pattern indicating a range of color saturation in an analysis of a color of the target object; and extending, by the processor of the computer, the range of color saturation in processing of the detecting the target object, when luminance of the first area in the image is lower than a first threshold and luminance of the second area in the image is equal to or higher than a second threshold.

8 Claims, 7 Drawing Sheets

(51) Int. Cl.
*G06K 9/20* (2006.01)
*A61D 17/00* (2006.01)
*G06T 7/90* (2017.01)
*G06K 9/46* (2006.01)
*G06T 5/00* (2006.01)
*G06T 7/20* (2017.01)
*G06K 9/78* (2006.01)

(52) U.S. Cl.
CPC ......... *G06K 9/2081* (2013.01); *G06K 9/4652* (2013.01); *G06K 9/58* (2013.01); *G06T 5/007* (2013.01); *G06T 7/90* (2017.01); *G06K 9/78* (2013.01); *G06T 7/20* (2013.01); *G06T 2207/10024* (2013.01); *G06T 2207/20008* (2013.01); *G06T 2207/30108* (2013.01)

(58) Field of Classification Search
CPC ............. G06K 9/00744; G06K 9/4652; G06K 9/2081; G06K 9/58; G06K 9/78; G06T 1/005; G06T 5/002; G06T 5/008; G06T 5/009; G06T 5/40; G06T 7/20; G06T 5/007; G06T 7/90; G06T 2207/10024; G06T 2207/30108; G06T 2207/20008; H04N 1/62; H04N 5/235; H04N 9/68; A61D 17/008
USPC ............... 348/229.1, 364, 648, 649; 353/85; 382/100, 104, 164, 165, 167, 254
See application file for complete search history.

(56) References Cited

U.S. PATENT DOCUMENTS

| | | | | |
|---|---|---|---|---|
| 8,462,171 | B2* | 6/2013 | Hinkel | H04N 9/68 345/589 |
| 8,861,847 | B2* | 10/2014 | Srinivasan | G06K 9/00375 382/164 |
| 9,262,690 | B2* | 2/2016 | Chiu | G06K 9/46 |
| 9,565,410 | B2* | 2/2017 | Huai | G06T 5/007 |
| 9,652,850 | B2* | 5/2017 | Minagawa | G06T 7/20 |
| 2005/0163393 | A1* | 7/2005 | Asari | G06T 5/009 382/254 |
| 2008/0062325 | A1* | 3/2008 | Jang | H04N 9/68 348/649 |
| 2008/0137946 | A1* | 6/2008 | Choe | G06T 5/002 382/167 |
| 2008/0158410 | A1* | 7/2008 | Lin | H04N 5/235 348/364 |
| 2009/0022414 | A1* | 1/2009 | Wei | G06T 5/008 382/254 |
| 2011/0051100 | A1* | 3/2011 | Lee | G03B 21/00 353/85 |
| 2012/0328186 | A1* | 12/2012 | Roux | G06T 5/40 382/164 |
| 2013/0188824 | A1* | 7/2013 | Hou | G06T 1/005 382/100 |
| 2015/0269748 | A1* | 9/2015 | Osamura | G06K 9/4652 382/165 |
| 2015/0373314 | A1* | 12/2015 | Zhu | H04N 1/62 348/648 |
| 2016/0066546 | A1 | 3/2016 | Borchersen et al. | |
| 2016/0259983 | A1* | 9/2016 | Tani | G06K 9/4647 |
| 2017/0039730 | A1* | 2/2017 | Chang | G06T 7/20 |
| 2019/0098869 | A1* | 4/2019 | Forster | A01K 11/004 |

OTHER PUBLICATIONS

O'Malley, Ronan et al., "Rear-Lamp Vehicle Detection and Tracking in Low-Exposure Color Video for Night Conditions", IEEE Transactions on Intelligent Transportation Systems, IEEE, Piscataway, NJ, USA, vol. 11, No. 2, Jun. 1, 2010, pp. 453-462, XP011347258.
Extended European Search Report dated Aug. 9, 2018 for corresponding European Patent Application No. 18156661.3, 8 pages.

* cited by examiner

FIG. 4

| HUE | $H_1° \sim H_2°$ |
|---|---|
| SATURATION | 140 TO 200 |
| BRIGHTNESS | $B_1$ to $B_2$ |

METHOD, APPARATUS FOR IMAGE ANALYSIS BASED ON COLOR SATURATION, AND NON-TRANSITORY COMPUTER-READABLE STORAGE MEDIUM

CROSS-REFERENCE TO RELATED APPLICATION

This application is based upon and claims the benefit of priority of the prior International Patent Application No. 2017-047811, filed on 13 Mar. 2017, the entire contents of which are incorporated herein by reference.

FIELD

The embodiment discussed herein is related to a method, an apparatus for image analyzation, and a non-transitory computer-readable storage medium.

BACKGROUND

Dairy farmers breed and milk dairy cows and assist mother cows to give birth. Without appropriate assistance, mother cows might have a stillbirth or die. A rancher, therefore, regularly goes around and watches images captured by monitoring cameras to observe how cows are behaving and determine whether mother cows are exhibiting a sign of childbirth.

Since it takes a lot of effort for a rancher to regularly go around and watch images captured by monitoring cameras, it is desirable to automatically notify the rancher whether mother cows are exhibiting a sign of childbirth. For this goal, for example, a technique has been proposed in which the amount of movement of a domestic animal is measured and whether the domestic animal is exhibiting a sign of childbirth is determined by attaching a collar in a certain color to the domestic animal, analyzing images, and repeatedly detecting a position of the collar.

Examples of the related art include Japanese Laid-open Patent Publication No. 2003-259137, Japanese Laid-open Patent Publication No. 2016-118912.

SUMMARY

According to an aspect of the invention, a method performed by a computer for image analyzation includes: receiving, by a processor of the computer, an image captured by an imaging device; specifying, by the processor of the computer, first and second areas in the image; detecting, by the processor of the computer, a target object from the image in accordance with a certain pattern indicating a range of color saturation in an analysis of a color of the target object; and extending, by the processor of the computer, the range of color saturation in processing of the detecting the target object, when luminance of the first area in the image is lower than a first threshold and luminance of the second area in the image is equal to or higher than a second threshold.

The object and advantages of the invention will be realized and attained by means of the elements and combinations particularly pointed out n the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of the data structure of detection parameters.

DESCRIPTION OF EMBODIMENT

In the related art, the accuracy of analyzing images undesirably tends to be low since the technique proposed in the related art attempts to detect a target from image information in accordance with a static pattern.

For example, when an appearance of a target (e.g., a collar worn by a subject animal) to be extracted from image information is varied due to an image capture environment such as time of a day, lighting conditions, and the like, the color saturation of the target to be extracted from the image information may not matches with a supposed condition regarding the color saturation of the target, and then the collar worn by the subject animal may not be detected correctly from the image information. It is noted that the collar worn by the subject animal is merely one example of a target to be detected from an image captured by an imaging device. The problem mentioned above may arise even when a target object, which is other than a collar, is attached to a subject animal.

In an aspect of the present disclosure, provided are techniques for improving the accuracy of analyzing images.

An embodiment of the techniques disclosed in the present disclosure will be described in detail hereinafter with reference to the drawings. The present disclosure, however, is not limited by the following embodiment.

Embodiment

Figure 1:
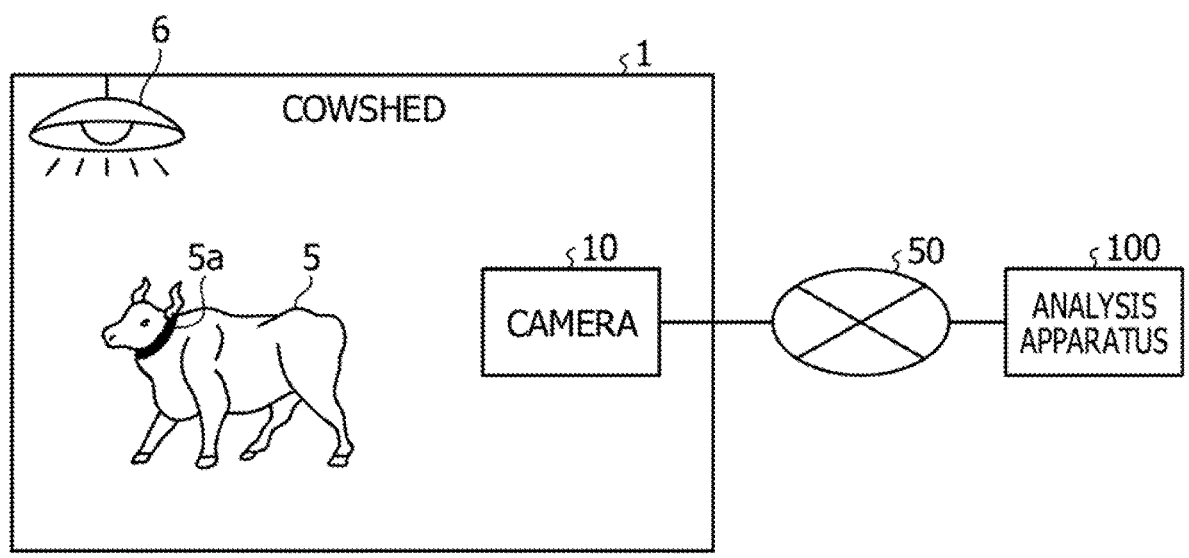
FIG. 1 is, a diagram illustrating an example of a system according to an embodiment.

FIG. 1 is a diagram illustrating an example of a system according to the present embodiment. As illustrated in FIG. 1, the system includes a camera 10 and an analysis apparatus 100. The camera 10 and the analysis apparatus 100 are connected to each other through a network 50.

The camera 10 is installed in an intended place such as a cowshed 1. In the cowshed 1, a cow 5 with a collar 5a in a certain color is bred and farmed. An image capture range of the camera 10 includes an area in the cowshed 1 in which the cow 5 can move. The camera 10 transmits information regarding a captured image to the analysis apparatus 100. The information regarding a captured image is information regarding a plurality of successive image frames. In the following description, image frames will also be referred to as "monitoring images".

The analysis apparatus 100 analyzes monitoring images transmitted from the camera 10 to identify coordinates of the collar 5a in the monitoring images and calculate the amount of movement of the cow 5. When identifying the coordinates of the collar 5a from a monitoring image, the analysis apparatus 100 determines whether an environment in which the monitoring image has been captured conforms with a first image capture environment (e.g., at night) and a second image capture environment (e.g., a fluorescent light 6 is on). If the environment in which the monitoring image has been captured conforms with both of the first image capture environment (e.g., at night) and the second image capture environment (e.g., the fluorescent light 6 is on), the analysis apparatus 100 extends a range of color saturation in detection parameters for detecting the collar 5a. As a result, even if the color saturation of the collar 5a in the monitoring image is low due to the image capture environment (e.g., at night and the fluorescent light 6 is on), the collar 5a can be detected. Analysis accuracy, therefore, may be improved even when the color saturation of the target object to be extracted from the image information is varied due to the image capture environment. As a result, the accuracy of detecting a target in monitoring images is improved, and the amount of movement of a subject (e.g., a cow) can be accurately estimated based on changes in a position of the target (e.g., a collar) detected from the monitoring images.

Figure 2:
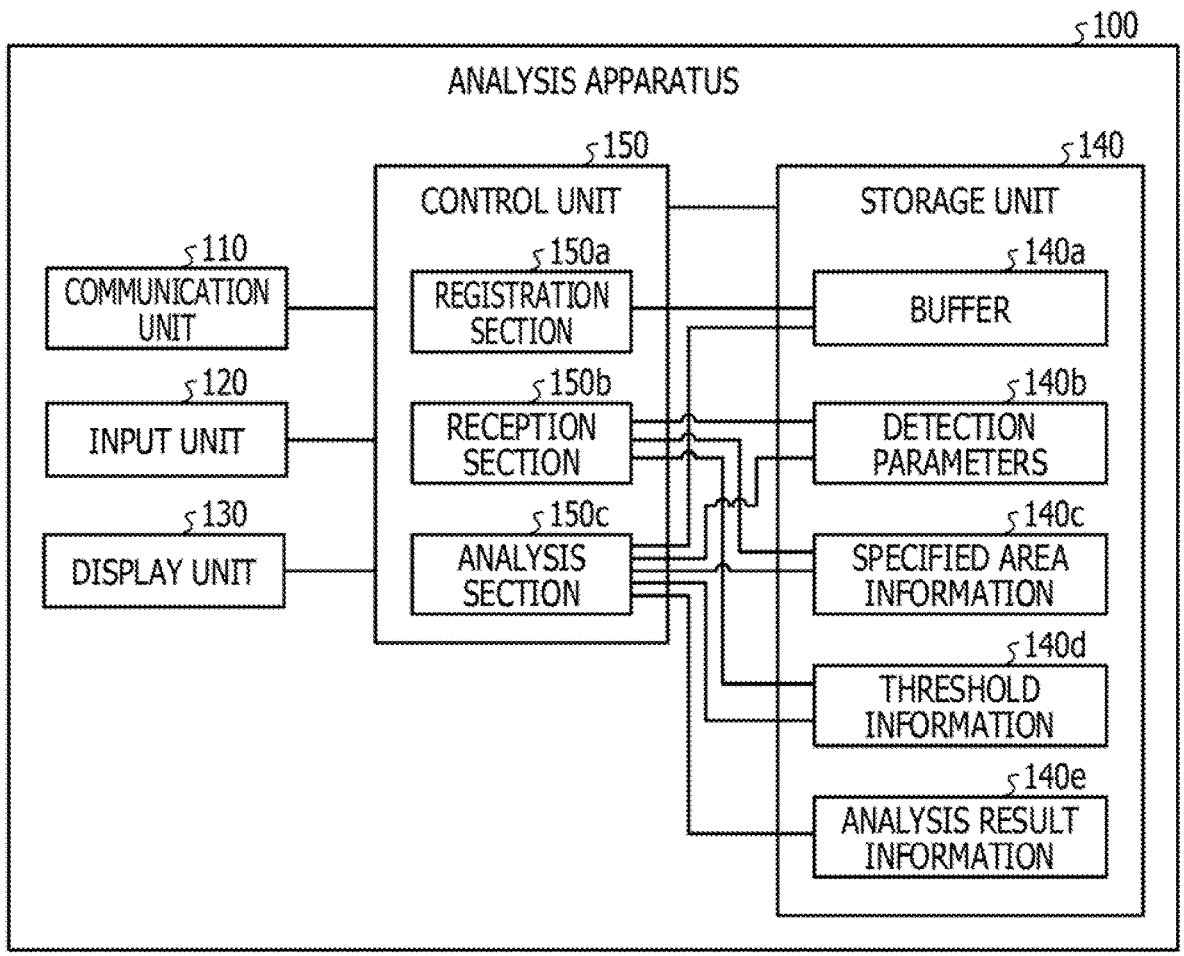
FIG. 2 is a functional block diagram illustrating the configuration of an analysis apparatus according to the embodiment.

FIG. 2 is a functional block diagram illustrating the configuration of the analysis apparatus 100 according to the present embodiment. As illustrated in FIG. 2, the analysis apparatus 100 includes a communication unit 110, an input unit 120, a display unit 130, a storage unit 140, and a control unit 150.

The communication unit 110 is a processing unit that communicates data with the camera 10 illustrated in FIG. 1 through the network 50. The control unit 150, which will be described later, receives information regarding images of the cowshed 1 from the camera 10 through the communication unit 110. The communication unit 110 may communicate with another external apparatus through the network 50. The communication unit 110 corresponds to a communication device.

The input unit 120 is an input device for inputting various pieces of information to the analysis apparatus 100. The input unit 120 corresponds to, for example, a keyboard, a mouse, a touch panel, or the like. An operator operates the input unit 120 to set detection parameters 140b, specified area information 140c, and threshold information 140d, which will be described later.

The display unit 130 is a display device that displays various pieces of information output from the control unit 150. The display unit 130 corresponds to, for example, a liquid crystal display, a touch panel, or the like.

The storage unit 140 includes a buffer 140a, the detection parameters 140b, the specified area information 140c, the threshold information 140d, and analysis result information 140e. The storage unit 140 corresponds to a semiconductor memory device such as a random-access memory (RAM), a read-only memory (ROM), or a flash memory or a storage device such as a hard disk drive (HDD).

The buffer 140a stores information regarding images transmitted from the camera 10. As described above, the information regarding images is information regarding a plurality of successive monitoring images associated with time.

Figure 3:
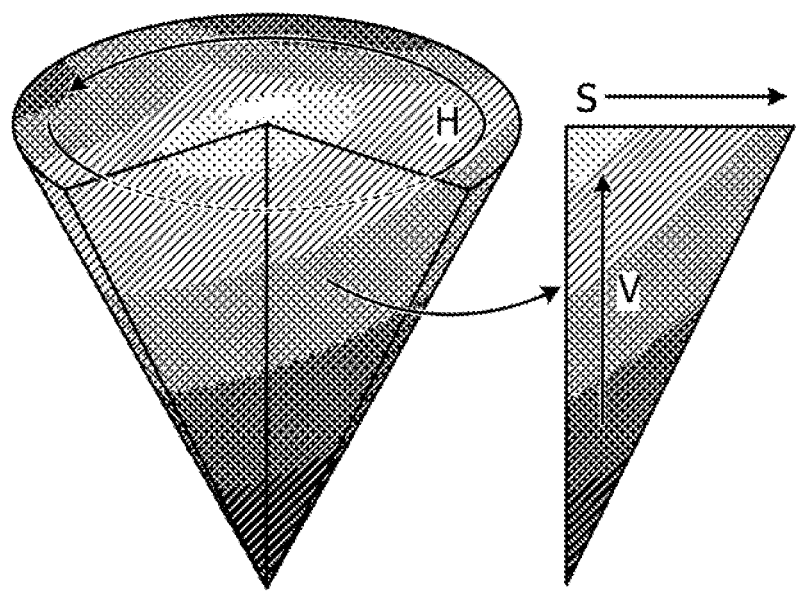
FIG. 3 is a diagram illustrating an example of a hue, saturation, and value (HSV) color space.

The detection parameters 140b are information that defines features of the color of the collar 5a, which is a detection target, in a hue, saturation, value (HSV) color space. FIG. 3 is a diagram illustrating an example of the HSV color space. The HSV color space includes hue, saturation, and brightness. For example, hue indicates a type of color and is defined in a range of 0° to 360°. Saturation indicates the vividness of a color and is set in a range of 0 to 255. Brightness indicates how bright a color is, and is set in a range of 0 to 255.

FIG. 4 is a diagram illustrating an example of the data structure of the detection parameters 140b. As illustrated in FIG. 4, the detection parameters 140b are information indicating the ranges of hue, saturation, and brightness corresponding to the features of the color of the collar 5a. In the example illustrated in FIG. 4, for example, the range of hue is H1° to H2°, the range of saturation is 140 to 200, and the range of brightness is B1 to B2.

Figure 5:
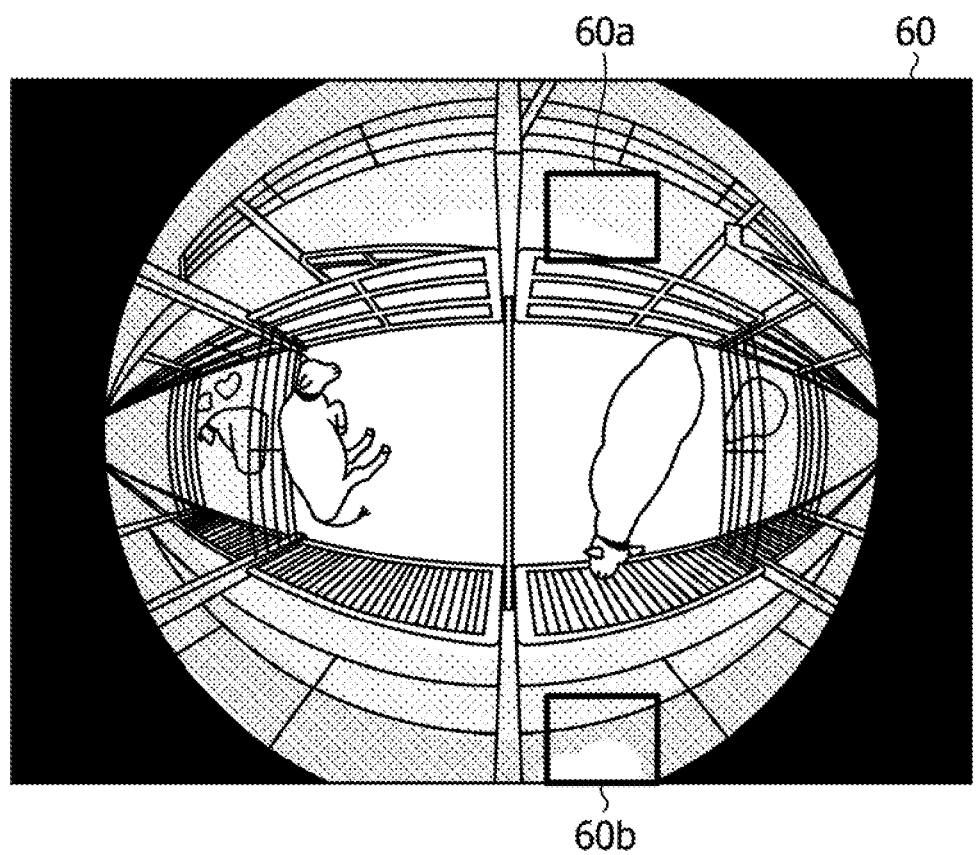
FIG. 5 is a diagram illustrating an example of first and second areas.

The specified area information 140c specifies, in an area of a monitoring image, coordinates of a first area for determining whether an environment in which the monitoring image has been captured is, the first image capture environment (e.g., at night) and coordinates of a second area for determining whether the environment in which the monitoring image has been captured is the second image capture environment (e.g., the fluorescent light 6 is on). FIG. 5 is a diagram illustrating an example of the first and second areas. In the example illustrated in FIG. 5, first and second areas 60a and 60b are set in a monitoring image 60.

The first and second areas 60a and 60b are assumed to be set in advance by the operator or the like. For example, the first area 60a is set in the monitoring image 60 at coordinates a certain distance away from an area in which the fluorescent light 6 exists. The second area 60b is set in the monitoring image 60 at coordinates within a certain distance from the area in which the fluorescent light 6 exists. Although the first and second areas 60a and 60b to be set in the monitoring image 60 have been described here, first and second areas can also be set in other monitoring images at similar positions.

The threshold information 140d includes first and second thresholds. The first threshold is compared with a luminance value of the first area 60a. If the luminance value of the first area 60a is smaller than the first threshold, it is determined that an environment in which a monitoring image has been captured is the first image capture environment (e.g., at night). The second threshold is compared with the luminance value of the second area 60b. If the luminance value of the second area 60b is equal to or larger than the second threshold, it is determined that an environment in which a monitoring image has been captured is the second image capture environment (e.g., the fluorescent light 6 is on).

The analysis result information 140e is information regarding results of analyses conducted by an analysis section 150c, which will be described later. For example, the analysis result information 140e is information in which coordinates of the collar 5a in the monitoring image 60 are associated with a time point.

The control unit 150 includes a registration section 150a, a reception section 150b, and the analysis section 150c. The control unit 150 can be achieved by a central processing unit (CPU), a microprocessor unit (MPU), or the like. The control unit 150 can also be achieved by a hardwired logic circuit such as an application-specific integrated circuit (ASIC) or a field-programmable gate array (FPGA).

The registration section 150a is a processing section that receives information regarding images from the camera 10 and that registers the received information regarding images to the buffer 140a.

The reception section 150b is a processing section that receives the detection parameters 140b, the specified area information 140c, and the threshold information 140d through the input unit 120. The reception section 150b stores the received detection parameters 140b, specified area information 140c, and threshold information 140d in the storage unit 140.

The analysis section 150c obtains monitoring images from the buffer 140a and performs an adjustment process and a detection process, which will be described hereinafter.

The adjustment process will be described. The analysis section 150c sets first and second areas in a monitoring image based on the specified area information 140c. The analysis section 150c compares a luminance value of the first area with the first threshold and a luminance value of the second area with the second threshold based on the threshold information 140d. For example, the analysis section 150c determines an average of luminance values of pixels included in the first area as the luminance value of the first area. The analysis section 150c determines an average of luminance values of pixels included in the second area as the luminance value of the second area.

If the luminance value of the first area is smaller than the first threshold, an environment in which the monitoring image has been captured is the first image capture environment (e.g., at night). If the luminance value of the second area is equal to or larger than the second threshold, the environment in which the monitoring image has been captured is the second image capture environment (e.g., the fluorescent light 6 of the cowshed 1 is on). If the luminance value of the first area is smaller than the first threshold and the luminance value of the second area is equal to or larger than the second threshold, the analysis section 150c adjusts the detection parameters 140b. In the following description, a condition that the luminance value of the first area be smaller than the first threshold and the luminance value of the second area be equal to or larger than the second threshold will be referred to as an "adjustment condition".

An example of the adjustment of the detection parameters 140b performed by the analysis section 150c will be described. The analysis section 150c accesses the detection parameters 140b and extends the range of saturation. For example, the analysis section 150c changes the range of saturation "140 to 200" to "70 to 200".

If the adjustment condition is no longer satisfied after the adjustment condition is satisfied and the analysis section 150c adjusts the detection parameters 140b, the analysis section 150c may reset the range of saturation to "140 to 200".

Next, the detection process will be described. The analysis section 150c compares a monitoring image with the detection parameters 140b to identify an area in the monitoring image whose hue, saturation, and brightness are included in the ranges of hue, saturation, and brightness defined as the detection parameters 140b. The analysis, section 150c determines coordinates of the center of gravity of the identified area as coordinates of the collar 5a. The analysis section 150c registers information in which a time point of the monitoring image and the coordinates of the collar 5a are associated with each other to the analysis result information 140e. The analysis section 150c repeats the above processes for all monitoring images included in the buffer 140a.

Figure 6:
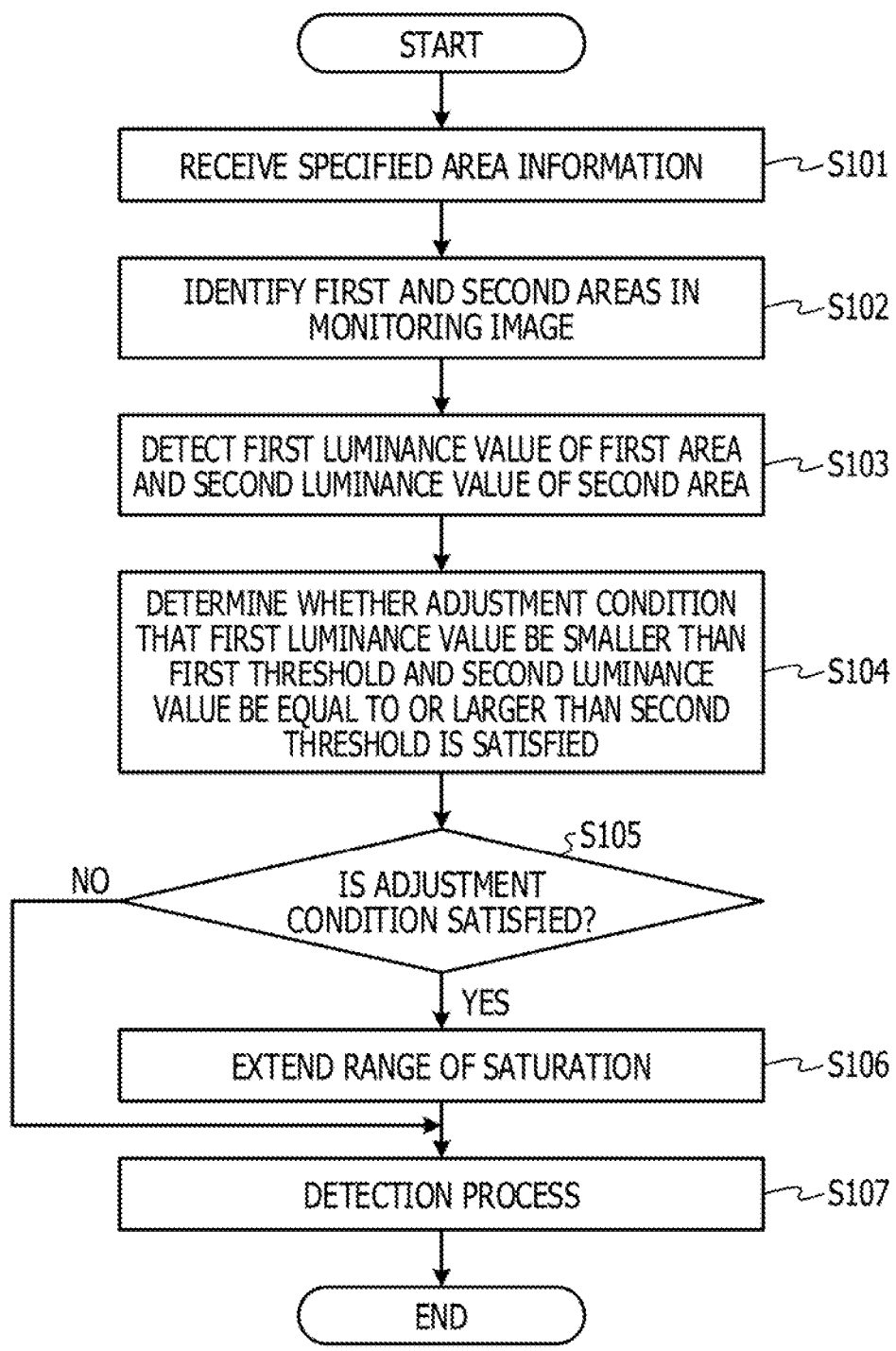
FIG. 6 is a flowchart illustrating a processing procedure performed by the analysis apparatus according to the embodiment.

FIG. 6 is a flowchart illustrating a processing procedure performed by the analysis apparatus 100 according to the present embodiment. As illustrated in FIG. 6, the reception section 150b of the analysis apparatus 100 receives the specified area information 140c (step S101).

The analysis section 150c of the analysis apparatus 100 identifies first and second areas in a monitoring image (step S102). The analysis section 150c detects a first luminance value of the first area and second luminance value of the second area (step S103).

The analysis section 150c determines whether the adjustment condition that the first luminance value be smaller than the first threshold and the second luminance value be equal to or larger than the second threshold is satisfied (step S104). If the adjustment condition is not satisfied (NO in step S105) the analysis section 150c proceeds to step S107.

If the adjustment condition is satisfied (YES in step S105), on the other hand, the analysis section 150c extends the range of saturation in the detection parameters 140b (step S106). The analysis section 150c performs the detection process (step S107).

Next, advantageous effects produced by the analysis apparatus 100 according to the present embodiment will be described. If the luminance value of the first area is smaller than the first threshold and the luminance value of the second area is equal to or larger than the second threshold, the analysis apparatus 100 extends the range of saturation in the detection parameters 140b and conducts an analysis of a color of a target included in a monitoring image. In other words, if an environment in which a monitoring image has been captured is the first image capture environment and the second image capture environment, the analysis apparatus 100 extends, in the process for analyzing the monitoring image, the range of saturation in the detection parameters 140b. As a result, even if the saturation of a target in a monitoring image is low due to environmental noise, the target can be detected, and analysis accuracy improves. Even if the saturation of the collar 5a in a monitoring image is low due to an image capture environment (e.g., at night and the fluorescent light 6 is on), a lower limit of the range of saturation is lowered in order to detect the collar 5a accurately. As a result, the accuracy of detecting a target in monitoring images improves, and the amount of movement of a subject (e.g., a cow) can be accurately estimated based on changes in a position of the target (e.g., a collar) detected from the monitoring images.

Although a cow has been taken as an example in the present embodiment, the present embodiment may also be implemented for other animals. An object attached to an animal may be an object other than a collar, such as a marker.

Figure 7:
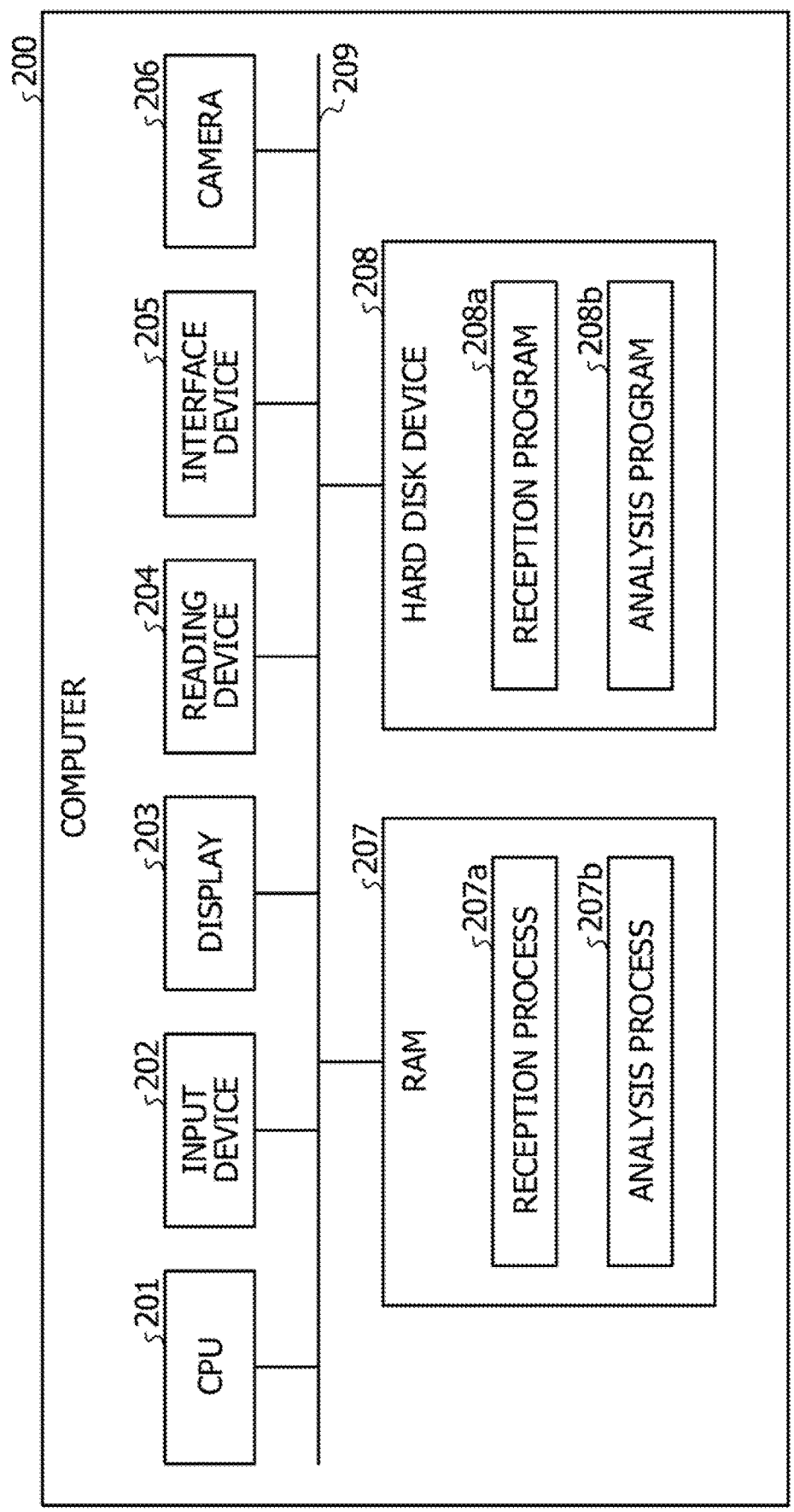
FIG. 7 is a diagram illustrating an example of the hardware configuration of a computer that achieves the same functions as the analysis apparatus.

Next, an example of the hardware configuration of a computer that achieves the same functions as the analysis apparatus 100 described in the above embodiment will be described. FIG. 7 is a diagram illustrating an example of the hardware configuration of a computer that achieves the same function as the analysis apparatus 100.

As illustrated in FIG. 7, a computer 200 includes a CPU 201 that performs various type of arithmetic processing, an input device 202 that receives data input by a user, and a display 203. The computer 200 also includes a reading device 204 that reads a program or the like from a storage medium and an interface device 205 that communicates data with other computers through a network. The computer 200 includes a camera 206. The computer 200 includes a RAM 207 that temporarily stores various pieces of information and a hard disk device 208. The devices 201 to 208 are connected to a bus 209.

The hard disk device 208 includes a reception program 208a and an analysis program 208b. The CPU 201 reads the reception program 208a and the analysis program 208b and loads the reception program 208a and the analysis program 208b into the RAM 207.

The reception program 208a functions as a reception process 207a. The analysis program 208b functions as an analysis process 207b.

The reception process 207a corresponds to the process performed by the reception section 150b. The analysis process 207b corresponds to the process performed by the analysis section 150c.

The programs 208a and 208b do not have to be stored in the hard disk device 208 in advance. For example, the programs 208a and 208b may be stored in a portable physical medium such as a flexible disk (FD), a compact disc read-only memory (CD-ROM), a digital versatile disc (DVD), a magneto-optical (MO) disk, or an integrated circuit (IC) card to be inserted into the computer 200. The computer 200 may then read the programs 208a and 208b from the portable physical medium and execute the programs 208a and 208b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method performed by a computer for image analyzation, the method comprising:
   receiving, by a processor of the computer, an image captured by an imaging device;
   specifying, by the processor of the computer, first and second areas in the image;
   detecting, by the processor of the computer, a target object from the image in accordance with a reference value information, the reference value information indicating at least a range of color saturation corresponding to the target object in an analysis of a color of the target object, the detecting of the target object being configured to determine a pixel in the image as a part of the target object when a color saturation of the pixel belongs to the range of color saturation indicated in the reference value information; and
   executing first processing when a first condition is met, the first processing including extending, by the processor of the computer, the range of color saturation indicated in the reference value information used in the detecting of the target object, the first condition being met when luminance of the first area in the image is lower than a first threshold and luminance of the second area in the image is equal to or higher than a second threshold.

2. The method according to claim 1,
   wherein the detecting includes a process for extracting an area in the image corresponding to a pixel indicating a color saturation within the range of color saturation.

3. The method according to claim 1,
   wherein the target object is an attachment attached to an animal.

4. The method according to claim 3,
   wherein the attachment is a collar.

5. The method according to claim 1,
   wherein the extending of the range of color saturation is a process for lowering a lower limit of the range of saturation.

6. The method according to claim 1, the method further comprising:
   obtaining a first position in a first image captured at a first time point by the imaging device, the first position being a position where the target object is detected by the detecting;
   obtaining a second position in a second image captured at a second time point by the imaging device, the second position being a position where the target object is detected by the detecting; and
   calculating, based on an amount of change between the first position and the second position, an amount of movement of a subject to which the target object is attached.

7. An apparatus for image analyzation, the apparatus comprising:
   a memory; and
   a processor coupled to the memory and configured to
   receive an image captured by an imaging device;
   specify first and second areas in the image;
   detect a target object from the image in accordance with a reference value information, the reference value information indicating at least a range of color saturation corresponding to the target object in an analysis of a color of the target object, the detecting of the target object being configured to determine a pixel in the image as a part of the target object when a color saturation of the pixel belongs to the range of color saturation indicated in the reference value information; and
   execute first processing when a first condition is met, the first processing including extending the range of color saturation indicated in the reference value information used in the detecting of the target object, the first condition being met when luminance of the first area in the image is lower than a first threshold and luminance of the second area in the image is equal to or higher than a second threshold.

8. A non-transitory computer-readable storage medium for storing a program that causes a processor to execute a process, the process comprising:
   receiving an image captured by an imaging device;
   specifying first and second areas in the image;
   detecting a target object from the image in accordance with a reference value information, the reference value information indicating at least a range of color saturation corresponding to the target object in an analysis of a color of the target object, the detecting of the target object being configured to determine a pixel in the image as a part of the target object when a color saturation of the pixel belongs to the range of color saturation indicated in the reference value information; and
   executing first processing when a first condition is met, the first processing including extending the range of color saturation indicated in the reference value information used in the detecting of the target object, the first condition being met when luminance of the first area in the image is lower than a first threshold and luminance of the second area in the image is equal to or higher than a second threshold.

* * * * *